(No Model.)
J. B. KIBLER.
DEVICE FOR POISONING FLIES.
No. 378,509. Patented Feb. 28, 1888.
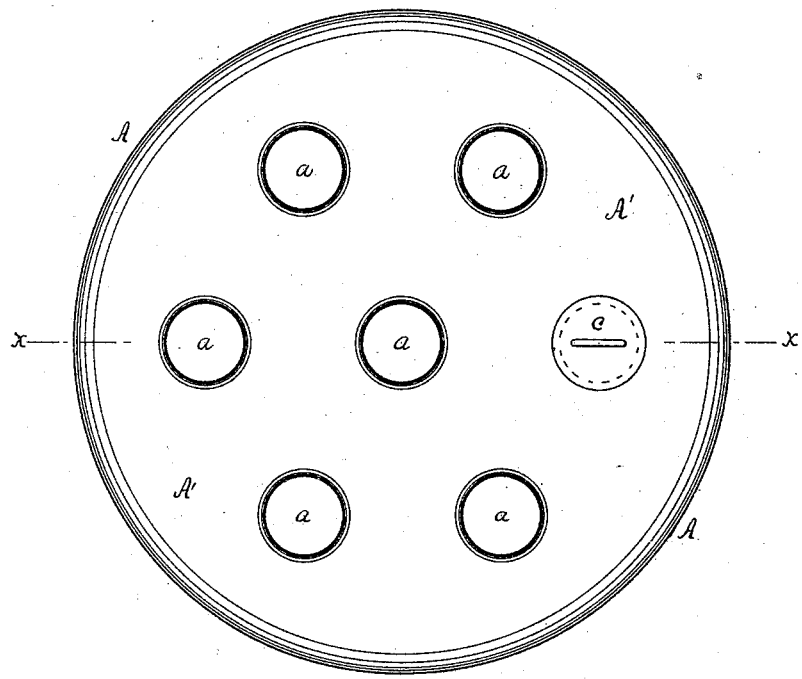
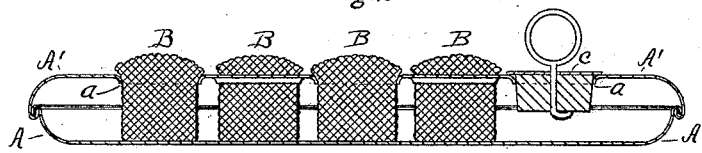
Witnesses,
A. Holt.
F. W. Culver
Inventor,
John B. Kibler,
By his Attorney.
P. H. Gunckel.

UNITED STATES PATENT OFFICE.

JOHN B. KIBLER, OF MINNEAPOLIS, MINNESOTA.

DEVICE FOR POISONING FLIES.

SPECIFICATION forming part of Letters Patent No. 378,509, dated February 28, 1888.

Application filed October 25, 1887. Serial No. 253,329. (No model.)

*To all whom it may concern:*

Be it known that I, JOHN B. KIBLER, a citizen of the United States, residing at Minneapolis, in the county of Hennepin and State of Minnesota, have invented certain new and useful Improvements in Devices for Poisoning Flies; and I do hereby declare that the following is a full, clear, and exact description of the same, reference being had to the accompanying drawings.

The object of my invention is the production of a covered vessel for containing liquid fly-poison and providing wicks having their ends exposed through holes in the vessel-cover, and that will continue moist by absorbing the liquid.

In the drawings, Figure 1 is a top view, and Fig. 2 a vertical sectional view, of the vessel, the latter showing the wicks in position.

A in the drawings represents a shallow vessel, made, preferably, of sheet metal, and having a permanent cover, A'.

*a a* designate holes in the cover A'.

B B are wicks of cotton or other suitable material fitting in the holes, so as to be held in place and adapted to convey the liquid by capillary attraction from the vessel to the exposed portions of the wicks.

The vessel in use is supplied with any well-known liquid fly-poison, which may be poured in through one of the holes *a*, that is without a wick and provided with a stopper, *c*, and the wicks when they have become saturated will afford access to the poison exterior to the vessel.

Having described my invention, what I claim, and desire to secure by Letters Patent, is—

A device for poisoning flies, consisting of a suitable vessel containing the poison, a cover for such vessel provided with apertures, and suitable wicks therein having their ends exposed, substantially as set forth.

JOHN B. KIBLER.

Witnesses:
J. L. DOBBIN,
P. H. GUNCKEL.